Figures 1, 2:
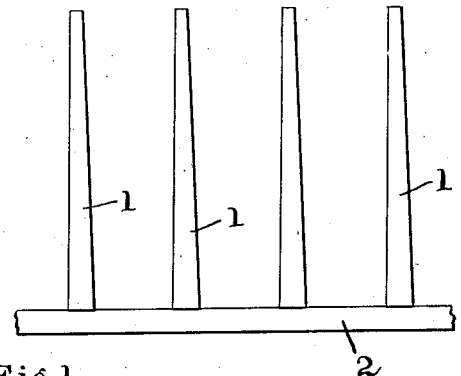

M. LACHMAN.
PROCESS OF ELECTRIC WELDING.
APPLICATION FILED SEPT. 28, 1909.

1,058,243.

Patented Apr. 8, 1913.

Witnesses:
Edward M Jellinek
Irene Lefkowitz

Inventor
Maurice Lachman
By his Attorneys
Townsend & Decker

UNITED STATES PATENT OFFICE.

MAURICE LACHMAN, OF NEW YORK, N. Y., ASSIGNOR TO UNIVERSAL ELECTRIC WELDING COMPANY, OF NEW YORK, N. Y., A CORPORATION OF NEW YORK.

PROCESS OF ELECTRIC WELDING.

1,058,243.  Specification of Letters Patent.  Patented Apr. 8, 1913.

Application filed September 28, 1909. Serial No. 519,997.

*To all whom it may concern:*

Be it known that I, MAURICE LACHMAN, a citizen of the United States, and a resident of New York, in the county of New York and State of New York, have invented certain new and useful Improvements in Processes of Electric Welding, of which the following is a specification.

My invention relates to a new process of electric welding, the main object being to provide a simple, cheap and quick method of joining pieces of metal by the use of a heating electric current and the application of pressure, to force the pieces of metal together.

A further object of my invention is to obtain a larger bearing of the one piece of metal on the other than has previously been obtained in butt welding and therefore the welded pieces will be able to stand more strain than heretofore.

In the art of electric welding, it is now well-known that the more limited the area of contact between the pieces of metal to be welded, the more rapid and economical the welding operation will be and my present invention contemplates obtaining this limited area of contact between two pieces to be butt welded in as economical a manner as possible.

One of the many uses to which my invention may be put, is in the manufacture of metallic rakes and similar objects, in which the tines are butt welded to the head. Heretofore, the head has been provided with a number of lugs formed by cutting transverse channels or grooves in the head and butt welding the ends of the tines to the lugs thus obtained. The rakes are made of high carbon steel and therefore the grooves or channels are difficult and expensive to cut in order to get the necessary restricted area of contact with the tine to successfully carry out the welding operation, as it is practically impossible to electrically weld the end of the tine to the flat side of the head by one operation and without providing some means for localizing the current at the point of weld.

By the use of my present invention no special preparation of the pieces is absolutely necessary as the tine may be merely brought into contact with an edge of the head provided with inclined sides, the edge forming the restricted area and whereby when the metal softens and pressure is applied the edge will cause the end of the tine to split and spread out and form increased bearings on the inclined sides of the head.

My invention consists in the novel process of electric welding hereinafter more particularly described and then specified in the claims.

While I describe my invention as carried into effect in the manufacture of rakes, it will be understood that I do not limit myself to this use as numerous other applications of the process might be conducted without departing from the spirit of my invention and which are equally well within the invention as set forth in the claims.

Figure 3:
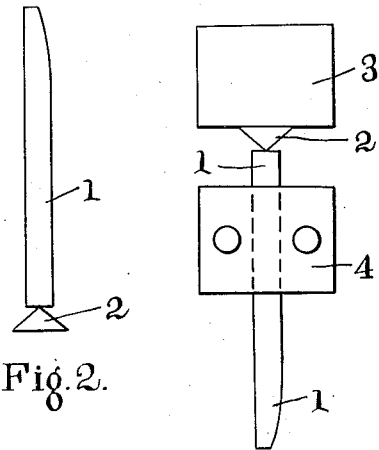
Figures 4, 6:
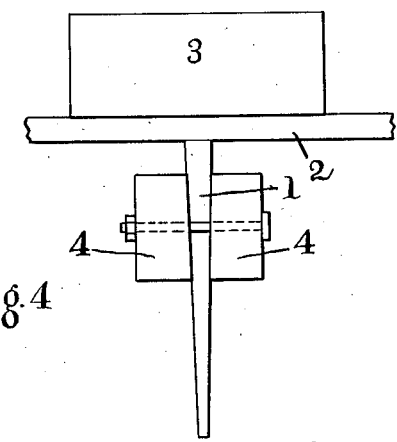
Figure 7:
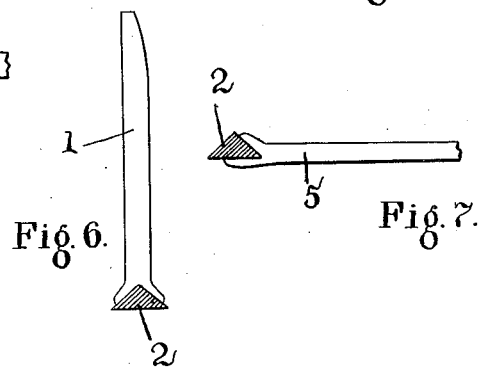
Figure 5:
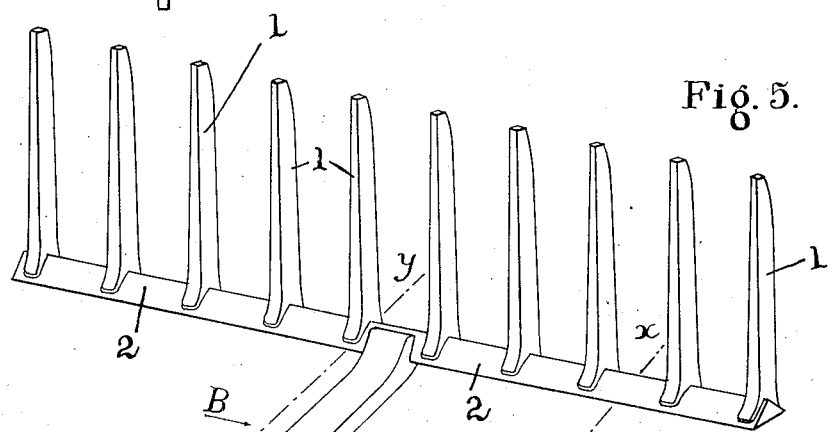

In the accompanying drawings, Figure 1 shows in side elevation pieces of metal to be united in accordance with my invention in its preferred form. Fig. 2 is an end view of the same. Fig. 3 illustrates diagrammatically the pieces to be welded and suitable contacts which might be employed to transmit the heating current and apply the welding pressure. Fig. 4 is a view looking at the apparatus shown in Fig. 3 and turned 90°. Fig. 5 is a perspective view of a rake made up in accordance with the preferred manner of carrying this invention into effect. Fig. 6 is a transverse section taken on the line X X Fig. 5 and looking in the direction of the arrow A. Fig. 7 is a similar section taken on the line Y Y Fig. 5 and looking in the direction of the arrow B.

The pieces of work 1, 2, to be welded are held between suitable electric contact and pressure blocks 3, 4, opposite each other, the said blocks forming part of an electric welding machine of any suitable form by which a heating current may be supplied to pass through the pieces 1, 2, said machine being of any suitable construction as well-known in the art so that pressure may also be applied to the work in a line connecting the contacts 3, 4.

One of the pieces, such as 2, is provided with one or more surfaces inclined to the line of pressure between the contact blocks 3, 4, so that a wedge shaped piece is presented, against the apex of which the end of the opposite piece 1 is butted, the apex being preferably a sharp edge, as shown, but not necessarily so.

The electric current is turned on, and the pressure applied preferably by moving one of the contact blocks 3, 4, toward the other whereby as the work softens at the point of contact of the two pieces, due to the heating current, the end of the piece 1 will be 5 split by the wedging action of the piece 2 and be forced down on the inclined sides of the piece 2, the pieces being united together both at the apex of the wedge shaped piece 2 and along the inclined sides to a greater 10 or less degree, the spreading of the piece 1 on the sides of the piece 2 forming an increased bearing and surface of contact between the parts.

The part 2 will split the part 1 before being welded thereto as the said part 2 having a large radiating surface will heat more slowly than the end of the tine, the comparative heating of the two parts being preferably also controlled by providing the electrode 3 with a larger radiating surface than the electrode 4 or the comparative heating may be controlled by any other means well known in the art.

Obviously, the inclined surfaces of the part 2 might extend the entire length and depth of the material or might only extend a part of the distance either way, the object being to provide a wedge shaped section at the point of contact of the two pieces, one or more sides of the wedge being inclined to the line of upsetting pressure whereby the opposite piece will be split and engage the sides of the piece to which it is welded.

The drawings illustrate a convenient way to manufacture rakes in accordance with the invention in which the pieces 1 indicate the tines or prongs and 2 indicates the head to which the tines are fastened. In this case the contact 3 is merely a block of conducting material against which the head 2 is seated and the contact 4 is formed as a clamp to grip the inclined sides of the tine as shown.

The head 2 is shown as a strip of metal triangular in cross-section, but might obviously be of any other suitable form whereby an inclined surface would be presented to the end of the tine, inclined to the line of pressure transmitted to the work through the contacts 3, 4, to upset the same and effect the welding of the two pieces.

It will be observed that a rake constructed as shown and described will be capable of standing great strain owing to the increased bearing surface of the tines on the head and the large welded union between the two parts effected thereby.

5 indicates the prong to which the handle for the rake is secured and which is welded to the head 2 in a manner similar to welding the tines 1 as above described, but located at right angles to the prongs as is usual.

What I claim as my invention is:

1. The improved method of electric welding, consisting in providing one of the pieces with a surface inclined to the line of pressure, butting another piece against the edge of said inclined surface, passing a heating current through the pieces and applying pressure whereby the abutted piece will split as the metal softens.

2. The improved method of uniting two pieces of metal, consisting in providing one of the pieces with a wedge shaped surface or surfaces, butting the end of the other piece against the edge of the wedge-shaped surfaces, passing an electric current through the pieces and applying pressure thereto whereby the wedge shaped piece will split the opposite piece as the metal softens.

3. The improved method of electric butt welding, consisting in butting the two pieces together with the end of one piece against an edge of the other, passing an electric current from one to the other and simultaneously applying pressure whereby the one piece will be split by the other.

4. The improved method of electric butt welding, consisting in providing one of the pieces with an inclined side to provide a limited area of contact, butting another piece against the edge of said inclined side, passing a heating current through the pieces and applying pressure whereby the opposite piece will split and form an increased bearing between the two pieces.

5. The improved method of uniting two pieces of metal, consisting in providing one of the pieces with a wedge shaped part having a narrow edge, butting the end of the other piece against the narrow edge of the wedge, passing a heating current through the pieces and applying pressure whereby the wedge will split the opposite piece.

6. The improved method of uniting two pieces of metal, consisting in providing one of the pieces with one or more surfaces inclined to the line of pressure, placing the other piece in contact with the edge of such surfaces and passing a heating current through the pieces whereby the opposite pieces will split upon the application of pressure.

7. The improved method of electric welding, consisting in providing one of the pieces with a sharp edge, butting the other piece against this edge, passing a heating current through the pieces and applying pressure whereby the one piece will be split by the other.

8. The improved method of electric welding, consisting in providing one of the pieces with surfaces inclined to the line of pressure, butting the other piece against the intersecting edge of the inclined surfaces, passing a heating current through the pieces and applying pressure whereby the one piece will be split by the inclined surfaces of the other.

9. The improved method of manufacturing rakes, consisting in providing a head with an inclined surface, butting the ends of tines against the edge of the inclined surface of the head, passing a heating current through the abutting pieces and applying pressure thereto whereby the tines will split and form a bearing on the sides of the head.

10. The improved method of manufacturing rakes, consisting in providing a head with a prong for the handle and butt welding the tines to an edge of the head whereby the tines will split and form an increased bearing on the sides of the head.

Signed at New York, in the county of New York and State of New York this 23rd day of September, A. D. 1909.

MAURICE LACHMAN.

Witnesses:
   REGINALD HAWLEY,
   MARGARET KELLEY.